Patented Nov. 24, 1936

2,062,263

UNITED STATES PATENT OFFICE 2,062,263

PRODUCING DIACETYL

Ernst Eberhardt, Ludwigshafen-on-the-Rhine, Germany, assignor to I. G. Farbenindustrie Aktiengesellschaft, Frankfort-on-the-Main, Germany No Drawing. Application July 27, 1934, Serial No. 737,203. In Germany August 8, 1933

3 Claims. (Cl. 260—134)

The present invention relates to a process of producing diacetyl.

I have found that diacetyl is obtained by treating divinyl or vinyl acetylene, or gases containing the said vinyl compounds, with acid aqueous solutions of mercuric salts, the reaction product being worked up while acid. It is preferable to heat the reaction mixture for some time at temperatures up to, say, 100° C. before working it up. With the exception of halogen hydracids, practically any inorganic acids may be used, as for example sulphuric acid, phosphoric acid and nitric acid. The concentration of the acid may be varied within wide limits. Working up is preferably effected by distillation of the acid reaction mixture.

The process may be arranged continuously by slowly leading the said vinyl compounds or gases containing the same downwards through a tower charged with a warm acid solution of a mercury salt, warmed to between 70° and 100° C., the effluent gases containing diacetyl being led through a condenser in which the greater part of the diacetyl is condensed. The diacetyl remaining in the gases may be absorbed in aqueous solvents such as water or in aqueous solution of sodium bisulphite. The gases still containing vinyl compounds are returned in a cycle.

During the reaction there takes place an adding on of oxygen at the double linkage with the simultaneous adding on of water in the case of vinyl acetylene. A part of the mercuric salt is reduced to mercurous salt during the reaction. In order to obtain good yields it is therefore preferable to employ the mercuric salt in the ratio of 4 molecular proportions of HgO to each molecular proportion of vinyl acetylene and still larger amounts of mercuric salt in the case of divinyl.

If vinyl acetylene be employed as the initial material, a mercury compound which is at first white separates from the acid solution of mercuric salt; this compound gradually becomes yellow when heated. Diacetyl may be set free therefrom by decomposition with acids. Halogen hydracids may also be employed for the said decomposition and also for working up the reaction product derived from divinyl.

The process according to this invention is well suited to the working up of gases containing vinyl acetylene such as are formed as by-products in the preparation of acetylene for example from methane in the electric arc and which may be recovered therefrom by strong cooling or by other suitable methods.

The following examples will further illustrate how the said invention may be carried out in practice but the invention is not restricted to these examples.

Example 1

6 litres of gaseous vinyl acetylene are led at about 15° C. into a solution of 300 grams of mercuric oxide in 2500 cubic centimetres of water and 400 cubic centimetres of sulphuric acid of 66° Baumé strength. The gas is very rapidly absorbed and a white mercury compound separates. After about half an hour the whole mixture is transferred to a closed vessel having a distillation attachment and is stirred for about 4 hours at from 90° to 100° C. The white mercury compound becomes gradually golden yellow. Diacetyl passes over in small amounts and is collected in water. In order to accelerate the decomposition, 700 cubic centimetres of concentrated hydrochloric acid are added. The intermediate compound passes into solution with the simultaneous deposition of calomel. Distillation is then effected until diacetyl no longer passes over, the latter condition being readily detected with the aid of the dimethylglyoxime nickel reaction.

Example 2

6 litres of a gas such as is obtained by strong cooling of acetylene obtained from methane in the electric arc and which contains vinyl acetylene and diacetylene in approximately equal proportions are led into a solution of 300 grams of mercuric oxide in 2500 cubic centimetres of water and 400 cubic centimetres of concentrated sulphuric acid of 66° Baumé strength in the manner described in Example 1. A mercury compound is precipitated in the form of a yellowish precipitate which becomes golden yellow after heating for several hours at from 90° to 100° C. It is worked up as described in Example 1.

Example 3

A gas containing vinyl acetylene such as is employed in Example 2 is led in a cycle through a reaction tower charged with a liquid which is warmed at 90° C. and consists of 500 cubic centimetres of 60 per cent phosphoric acid, 500 cubic centimetres of water and 200 grams of mercuric oxide. The gases leaving the reaction tower pass through a condenser provided with a stripper in which an aqueous yellow condensate containing diacetyl is deposited, then through a solution of sodium bisulphite in order to recover uncondensed diacetyl, then through water and caustic soda solution and are finally returned to a gas holder or to the reaction tower. The diacetyl may be directly recovered from the aqueous condensate and may be recovered from the solution of sodium bisulphite by careful distillation after the addition of sulphuric acid; the resulting diacetyl is a yellow oil containing water which passes over at about 75° C.

*Example 4*

6 litres of butadiene are led at room temperature into a solution of 600 grams of mercuric oxide in 2500 cubic centimetres of water and 500 cubic centimetres of sulphuric acid of 66° Baumé strength. The gas is very rapidly absorbed without any deposition of mercury compound. The solution is stirred for about 4 hours while heating to about 100° C. A golden yellow precipitate is gradually deposited and this is worked up in the manner described in Example 1. The distillate consists of an aqueous solution of diacetyl.

What I claim is:—

1. A process of producing diacetyl which comprises causing a vinyl compound selected from the group consisting of divinyl and vinyl acetylene to react with an aqueous solution of a mercuric salt in the presence of an oxygen containing strong inorganic acid in the ratio of one molecular proportion of the said vinyl compound to at least 4 molecular proportions of HgO, heating the white precipitate of the mercuric addition compound obtained at a temperature of between 70–100° centigrade until it has become yellow and working up the reaction product while acid.

2. A process of producing diacetyl which comprises causing divinyl to react with an aqueous solution of a mercuric salt in the presence of an oxygen containing strong inorganic acid in the ratio of one molecular proportion of the said vinyl compound to at least 4 molecular proportions of HgO, heating the white precipitate of the mercuric addition compound obtained at a temperature of between 70–100° centigrade until it has become yellow and working up the reaction product while acid.

3. A process of producing diacetyl which comprises causing vinyl acetylene to react with an aqueous solution of mercuric salt in the presence of an oxygen containing strong inorganic acid in the ratio of one molecular proportion of the said vinyl compound to at least 4 molecular proportions of HgO, heating the white precipitate of the mercuric addition compound obtained at a temperature of between 70–100° centigrade until it has become yellow and working up the reaction product while acid.

ERNST EBERHARDT.